US012535206B1

(12) United States Patent
Selak et al.

(10) Patent No.: US 12,535,206 B1
(45) Date of Patent: Jan. 27, 2026

(54) WATERPROOF LIGHT BULB ASSEMBLY

(71) Applicants: Steven James Selak, Pasadena, CA (US); Henning Zieger, Pasadena, CA (US)

(72) Inventors: Steven James Selak, Pasadena, CA (US); Henning Zieger, Pasadena, CA (US)

( * ) Notice: Subject to any disclaimer, the term of this patent is extended or adjusted under 35 U.S.C. 154(b) by 0 days.

(21) Appl. No.: 18/786,256

(22) Filed: Jul. 26, 2024

(51) Int. Cl.

| | |
|---|---|
| ***F21V 31/00*** | (2006.01) |
| ***F21K 9/232*** | (2016.01) |
| ***F21K 9/238*** | (2016.01) |
| ***F21Y 113/00*** | (2016.01) |
| ***F21Y 115/10*** | (2016.01) |

(52) U.S. Cl.
CPC ............ *F21V 31/005* (2013.01); *F21K 9/232* (2016.08); *F21K 9/238* (2016.08); *F21Y 2113/00* (2013.01); *F21Y 2115/10* (2016.08)

(58) Field of Classification Search
CPC ............. F21K 9/232; F21K 9/238; F21K 9/69
See application file for complete search history.

(56) References Cited

U.S. PATENT DOCUMENTS 11,448,390 B2 * 9/2022 Selak ........................ F21V 3/02
2011/0170299 A1 * 7/2011 Takase ...................... F21V 5/04 362/308
2016/0298826 A1 * 10/2016 Lim ...................... F21V 7/0091
2021/0116103 A1 * 4/2021 Bu ............................ F21K 9/69
2022/0260244 A1 * 8/2022 Selak ...................... F21K 9/232

FOREIGN PATENT DOCUMENTS

EP 2367045 A1 * 9/2011 ................ F21V 5/04
KR 20130109458 A * 10/2013 ................ F21V 3/10

OTHER PUBLICATIONS

Machine translation of Yu, KR 20130109458-A, published Oct. 8, 2013 (Year: 2013).*

* cited by examiner

*Primary Examiner* — William N Harris
(74) *Attorney, Agent, or Firm* — Millen, White, Zelano & Branigan P.C.; William F. Nixon

(57) ABSTRACT

A waterproof light bulb assembly implements a plurality of light emitting diodes (LEDs) for use in light fixture in an outdoor or wet environment. The light bulb assembly includes a clear plastic bulb shell which used a threaded portion to mate to a bulb cap. The bulb cap includes a passage to receive a light emitting assembly having a direct current (DC) connector. The light emitting assembly includes the plurality of LEDs and a printed circuit board. The light bulb assembly also includes a lens assembly that is located above and cover the light emitting assembly. The lens assembly includes lens in a shape of upside-down pyramid seated on a top of a hollow cylinder. The hollow cylinder is inserted into the bulb cap and covers the light emitting assembly. The lens is configured to reflect and refract a light beam emitted from the light emitting assembly.

19 Claims, 13 Drawing Sheets

WATERPROOF LIGHT BULB ASSEMBLY

BACKGROUND OF THE INVENTION

Field of the Invention

The present invention relates to a waterproof light bulb assembly having light emitting diodes configured to fit into existing light fixtures and to provide a visual appearance corresponding to a conventional light bulb.

Discussion of the Related Art

An LED is a semiconductor device that emits light when a current flows through it. Electrons in the semiconductor device recombine with electron holes, releasing energy in the form of photons. That is, the LED produces light through electroluminescence, not incandescence like traditional light bulbs. LEDs have many advantages over incandescent light sources, including lower power consumption, a longer lifetime, improved physical robustness, smaller sizes, and faster switching. As LEDs are more energy efficient than the traditional incandescent light, they have become popular as lighting device.

However, most light emitting diode (LED) light bulbs do not provide the appearance or lighting effect of conventional light bulbs, especially when used in a chandelier or other outward-facing lighting assembly. This is because that LED light is emitted like a spotlight, which when facing upward, does not provide similar look of a standard candelabra light bulb. Further, LED and conventional light bulbs are not effective for outdoor use, especially for those with upward-facing styles. Further, if the LED light bulbs are facing upwardly, these bulbs will fail in wet conditions and do not last long.

SUMMARY OF THE INVENTION

The disclosed embodiments relate to an upward-facing waterproof light bulb for use with a chandelier or other lighting fixture in outdoor settings. The waterproof light bulb may include a fake or hollow plastic shell to recreate a standard light bulb complete with a standard screw base or socket that fits most light fixtures. In some embodiments, the shell may resemble a standard Edison candelabra light bulb complete with a screw base that will fit into existing off the shelf chandeliers available today.

Inside the shell are a plurality of LED modules powered by 12 volts. The modules are configured in the shell in a way that makes the assembly waterproof. This feature allows the disclosed bulbs to be used in any environment including wet location lighting applications. Each waterproof light bulb may provide the equivalent lumens of a standard 60 watt bulb. These waterproof LED bulbs may be used to retrofit any 120 watt indoor chandelier which allows it to be used in any exterior environment without fear of electrocution or operational failure. Further, the disclosed bulbs may be used for an extended period, such as 10 years, before needing replacement. The disclosed bulbs also do not rust, corrode, or fail due to environmental issues like conventional bulbs or other LED bulbs.

A waterproof light bulb is disclosed. The waterproof light bulb includes a plastic bulb shell having a threaded portion corresponding to a first mating part and a bulb cap to fit into the first mating part of the plastic bulb shell and having a passage centered therewithin. The waterproof light bulb also includes a light emitting assembly having a direct current (DC) connector to fit through the passage within the bulb cap. The light emitting assembly includes a printed circuit board to fit into a step within the bulb cap and connected to the DC connector. The light emitting assembly also includes a plurality of light emitting diodes configured on the printed circuit board to face upwards from the printed circuit board. The waterproof light bulb assembly further includes a lens assembly located on the top of the light emitting assembly. The lens assembly incudes a lens having a cut-edged top surface, and a peak positioned to point towards the light emitting assembly, and a hollow cylinder supporting the lens, wherein the lens is inserted on a top of the hollow cylinder, and a height of the hollow cylinder is determined based on a focal distance between the lens and the light emitting assembly, the lens is configured to reflect and refract a light emitted from the light emitting assembly so that the light bulb assembly can be faced upwards and is cosmetically similar to a traditional candelabra light bulb. Moreover, the light bulb shell can be made either clear or frosted plastic.

A waterproof light bulb assembly is disclosed. The waterproof light bulb assembly includes a plastic bulb shell having an exterior threaded portion, and a bulb cap configured to fit within the plastic bulb shell and having a passage therein. The waterproof light bulb assembly also includes a light emitting assembly having a direct current (DC) connector to fit through the passage within the bulb cap. The light emitting assembly includes a printed circuit board connected to the DC connector, a plurality of light emitting diodes configured on the printed circuit board to face perpendicular to the printed circuit board. The light emitting assembly also includes a switching circuit configured on the printed circuit board to regulate an amount of heat generated by the light emitting assembly. A lens assembly located on the top of the light emitting assembly. The lens assembly incudes a lens having a cut-edged top surface, and a peak positioned to point towards the light emitting assembly, and a hollow cylinder supporting the lens, wherein the lens is inserted on a top of the hollow cylinder, and a height of the hollow cylinder is determined based on a focal distance between the lens and the light emitting assembly, the lens is configured to reflect and refract a light emitted from the light emitting assembly so that the light bulb assembly can be faced upwards and is cosmetically similar to a traditional candelabra light bulb. The waterproof light bulb assembly also includes a socket having an interior threaded portion to receive the exterior threaded portion of the plastic bulb shell. The socket includes a female connector to receive the DC connector. The socket also includes an O-ring positioned in the female connector to engage the DC connector. Moreover, the light bulb shell can be made either clear or frosted plastic.

A LED lighting device is further disclosed. The LED lighting device includes an assembly of a light emitting module and a lens module, and a direct current (DC) connector, connected with the light emitting module and extended therefrom for connecting to a power source. The light emitting module is connected to the DC connector and includes a printed circuit board connected to the DC connector, a plurality of LEDs configured on the printed circuit board to face upwards from the printed circuit board, and a switching (LC) circuit configured on the printed circuit board configured to regulate an amount of heat generated by the light emitting assembly. The lens module is located on the top of the light emitting module and is configured to cover the light emitting module. The lens module includes a lens in a shape of upside-down pyramid, having a cut-edged top surface and a peak positioned to point towards the light emitting assembly. The lens module further includes a hollow cylinder supporting the lens. In the lens module, the lens is inserted on a top of the hollow cylinder, and a height of the hollow cylinder is determined based on a focal distance between the lens and the light emitting assembly. The lens is configured to reflect and refract a light emitted from the light emitting module so that the LED lighting device is an upward-facing lighting device and is cosmetically similar to a traditional candelabra light bulb.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION OF THE PREFERRED EMBODIMENTS

Figure 1:
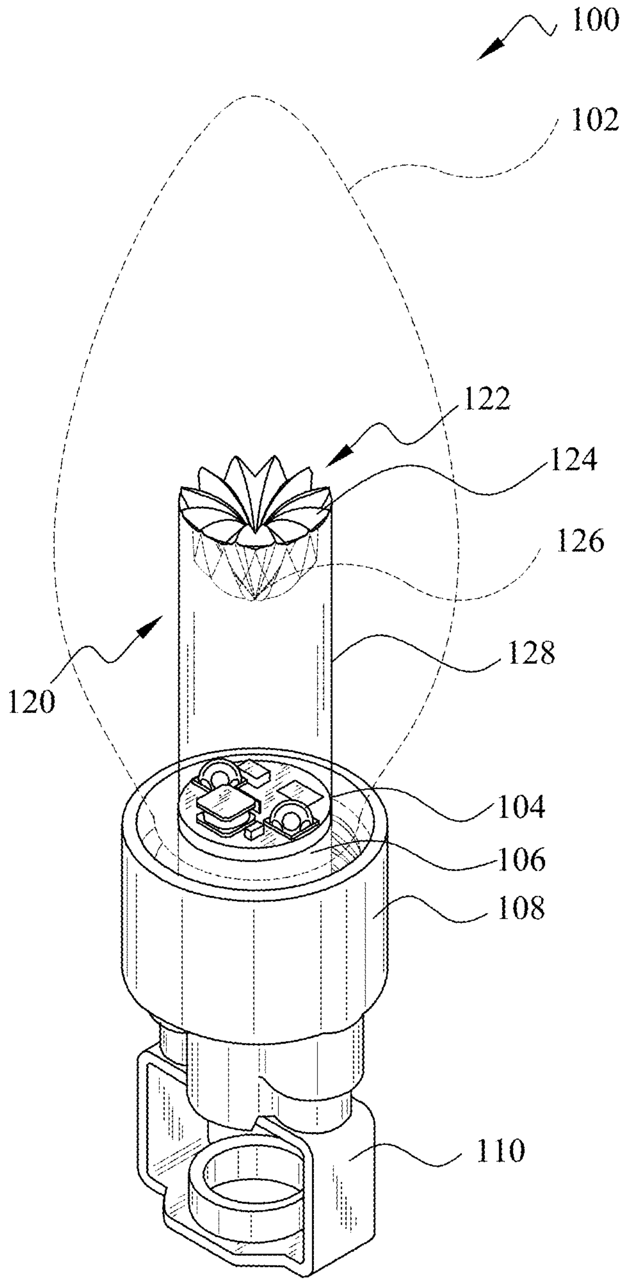
FIG. 1 illustrates a waterproof light bulb assembly according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

The waterproof light bulb assembly of the disclosed embodiments includes a bulb cavity configured to allow for the correct heat release provided by the plurality of LEDs. Excessive heat discharge can cause damage to the LED bulb. The LED modules inside the bulb generate heat. If there are too many LED modules, then the interior of the bulb overheats which causes the circuitry and other components within the bulb to fail. Too few modules, and the light bulb is too dim for use in an outdoor or wet environment. Further, the light bulb should resemble a conventional bulb. Thus, the disclosed embodiments provide a plurality of LED modules to emit enough light for use in chandeliers and other light fixtures but also account for the generated heat to avoid failures.

It should be noted that the disclosed waterproof light bulb assembly may be used in any location, including outdoors in the rain or in inclement weather. The light bulbs do not require extensive maintenance. Unlike conventional light bulbs, the disclosed light bulbs resist corrosion from the elements and exposure. For example, a conventional upward-facing Edison light bulb may only last a short time being used outdoors before needing to be replaced. This failure rate precludes use of the Edison conventional bulb in remote or elevated locations as personnel would have to lower and replace the bulbs frequently.

Although there are LED bulbs on the market, these devices do not look or illuminate like conventional incandescent light bulbs. The disclosed embodiments allow for a modern, energy efficient, all weather light bulb that is upward-facing and is cosmetically identical or looks similar to any traditional indoor candelabra light bulb. This feature may be important for set locations and the ambience being created by using a chandelier. Further, the LED light bulbs in accordance with the disclosed embodiments are applicable to wet location environments.

The disclosed embodiments also allow for existing or even antique light fixtures to be retrofitted with the waterproof light bulbs. The disclosed light bulb assembly may fit different light bulb socket designs and dimensions. This benefit allows the disclosed light bulbs to fit many varieties of devices and fixtures, some of which are antiques in that they do not include the designs of modern light fixtures.

The waterproof light bulb assembly in accordance with the disclosed embodiments includes LED modules as light sources and a hollow light bulb, or light bulb shell. The LED modules including a plurality of LEDs are installed in the light bulb assembly with the plurality of LEDs facing upwardly. The light bulb shell acts like that glass portion of a conventional light bulb. This appearance also is provided based on the configuration of the LED modules within the light emitting assembly. The LED light is not as soft as the light emitted in a conventional light bulb, and as the plurality of LEDs face upwardly, the LED light will shine in an upward direction. Conventionally, the light bulb shell is made frosted to let light pass through but not too frosted to diminish the lighting effects. The frosted light bulb shell helps reserving some emitting light inside of the light bulb to provide the appearance of a conventional light bulb. The disclosed embodiments provide a unique waterproof light bulb assembly in which the light bulb shell may be made of clear plastic. An additional lens is disclosed inside the light bulb shell to reflect and refract the light shone by the LED module to render the light bulb having an appearance of a conventional light bulb. In the disclosed embodiments, the bulb shell made be made of clear or frosted plastic.

FIG. 1 depicts a waterproof light bulb assembly 100 according to the disclosed embodiments. Light bulb assembly 100 includes a plastic bulb shell 102 and a lens assembly 120. Plastic bulb shell 102 may be made of clear plastic and corresponds to the glass portion found on conventional light bulbs. Light passes through plastic bulb shell 102. Lens assembly 120 is located on the top of a light emitting assembly 104. Lens assembly 120 has a lens 122 in a shape of a pyramid, with cut-off-edge top surface 124 and a peak 126 on a bottom. Lens 122 may be made of a polycarbonate material or any appropriate material that allows a light to pass through. In use, a light beam emitted from light emitting assembly 104 will shine on lens 122 from below. Cut-off-edge top surface 124 and peak 126 of lens assembly 120 reflect and refracted the light beam emitted from light emitting assembly 104 to represent an appearance of a traditional candelabra light bulb.

Lens 122 is located above light emitting assembly 104 and is apart from assembly 104 with a distance called a focal length. To do so, lens 122 is inserted on a top of hollow cylinder 128. The height of hollow cylinder 128 is determined to ensure that the light emitted from light emitting assembly 104 will travel to lens 122 and be reflected and refracted by lens 122, thereby a light bulb appearance most simulated to the conventional light bulb are generated.

Figure 2:
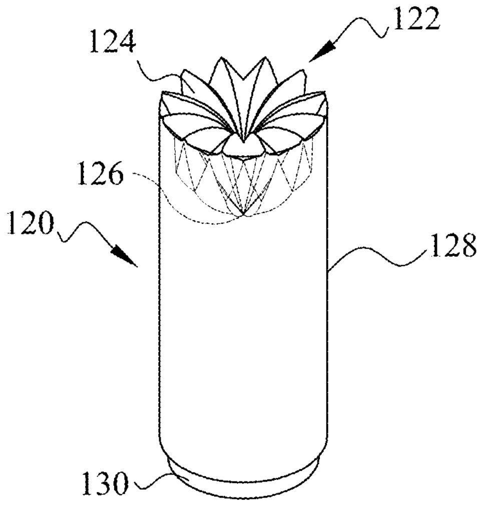
FIG. 2 illustrates an lens assembly used in the waterproof light bulb assembly according to the disclosed embodiments.

A detailed view of lens assembly 120 is illustrated in FIG. 2. As shown in FIG. 2, lens 122 is inserted on the top of hollow cylinder 128 with peak 126 toward the bottom of hollow cylinder 128. A lower end 130 of hollow cylinder 128 is designed narrower to have a smaller diameter than the rest of hollow cylinder 128. The diameter of lower end 130 matches an inner diameter of a bulb cap 106 so that hollow cylinder 128 can be inserted tightly in bulb cap 106.

Light emitting assembly 104 includes components that emit light using LED modules. Preferably, light emitting assembly 104 includes a plurality of LEDs that are oriented upwards into plastic bulb shell 102. Light emitting assembly 104 also includes circuitry and components to regulate the heat given off by the LED modules. Light bulb shell 102 also may be sized to account for the heat generated by light emitting assembly 104.

Bulb cap 106 seats light emitting assembly 104 as well as mates that light bulb shell 102. Disclosed in greater detail below, bulb cap 106 is configured to resemble a conventional light bulb that is placed in a light fixture. A direct current (DC) connector of light emitting assembly 104 extends through bulb cap 106 to receive power to the circuitry and LED modules. Bulb cap 106 is fits tightly, or mates, with a portion of light bulb shell 102 to provide a waterproof seal.

Lens assembly 120 is seated on the top of light emitting assembly 104 and is inserted in bulb cap 106. As describe above, lower end 130 of hollow cylinder 128 has a smaller diameter than the rest of hollow cylinder 128. Therefore, after lower end 130 of hollow cylinder 128 is inserted in bulb cap 106, the rest of hollow cylinder 128 will sit on bulb cap 106 to secure the position of lens assembly 120.

Light bulb assembly 100 also includes socket 108 and mount 110. Socket 108 may receive bulb cap 106 and a threaded portion of light bulb shell 102. Socket 108 also may help attach the DC connector to a wire or power source in a secure manner. Socket 108 is secured to mount 110. Mount 110 is configured to fit light bulb assembly 100 to a variety of light fixtures.

Figure 3:
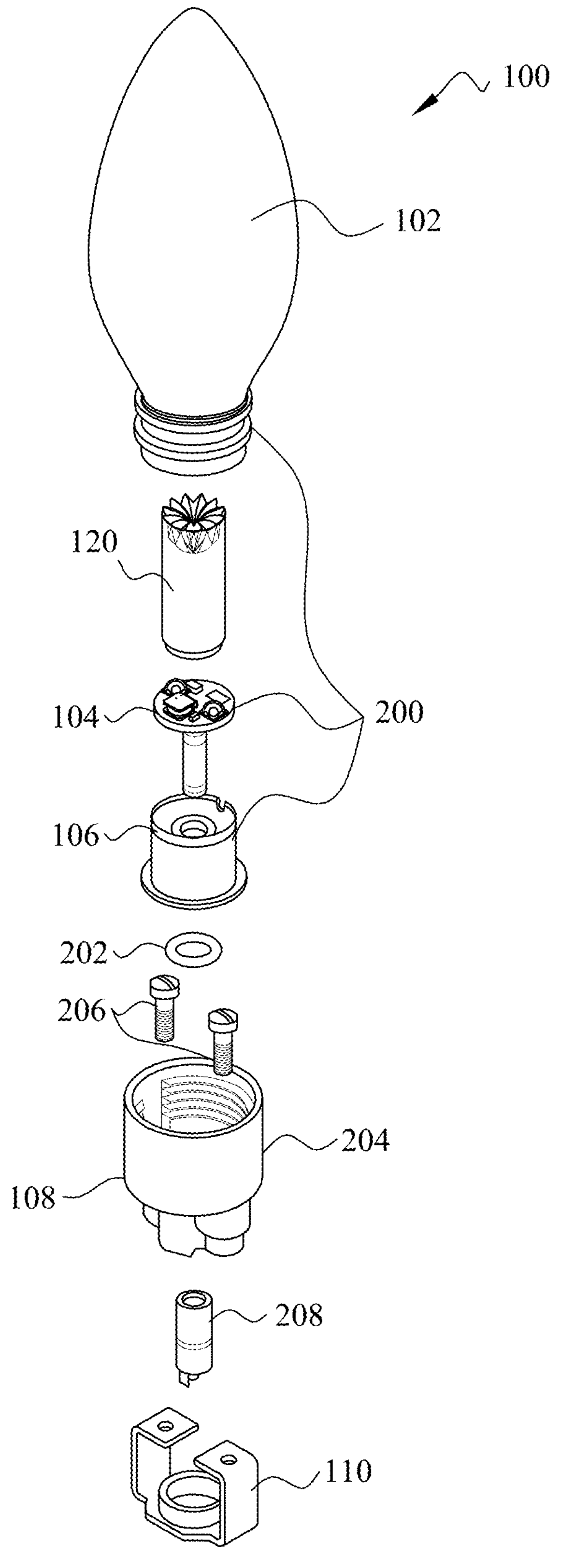
FIG. 3 illustrates an exploded view of the waterproof light bulb assembly according to the disclosed embodiments.

FIG. 3 depicts an exploded view of light bulb assembly 100 according to the disclosed embodiments. Light bulb shell 102, lens assembly 120, light emitting assembly 104, and bulb cap 106 may comprise waterproof light bulb 200 within assembly 100. Light bulb 200 may be a distinct component from socket 108 and mount 110. FIG. 3 also shows other components of assembly 100.

As can be seen in FIG. 3, bulb shell 102, lens assembly 120, and light emitting assembly 104 fit into bulb cap 106 to create light bulb 200. Light bulb 200 is waterproof in that the plastic bulb shell, lens assembly 120, and secured fit between the shell and the bulb cap and the lens assembly 120 and the bulb cap does not allow water or other elements into contact with the LED modules. Further, as these materials are not comprised of metal, they may withstand exposure outside and to water. Preferably, light bulb shell 102, lens assembly 120, and bulb cap 106 are made of plastic. As disclosed below, light bulb shell 102, lens assembly, and bulb cap 106 are fitted to attach to each other in a secure manner.

Some components of socket 108 are shown in more detail. Socket 108 includes socket housing 204. Socket housing 204 includes a threaded interior portion to receive the threaded exterior portion of light bulb shell 102. Two screws 206 attach socket housing 204 to mount 110. Socket 108 also includes o-ring 202 and female connector 208. These components engage the DC connector of light emitting assembly 104, disclosed in greater detail below. Female connector 208 fits within socket housing 204.

Figure 4:
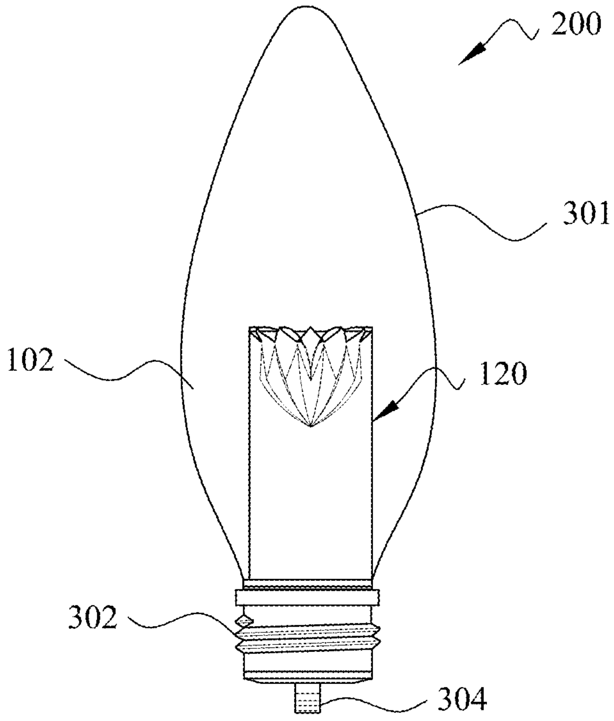
FIG. 4 illustrates a light bulb in an assembled state according to the disclosed embodiments.

FIG. 4 depicts light bulb 200 in an assembled state according to the disclosed embodiments. Light bulb shell 102 includes shaped portion 301 and exterior threaded portion 302. Light bulb shell 102 is made of plastic, preferably clear plastic. Lens assembly 120 is located inside light bulb shell 102 to cover light emitting assembly 104 (not shown) so that the light from the LEDs of LED modules is not emitting directly outside the light bulb shell.

Figure 5:
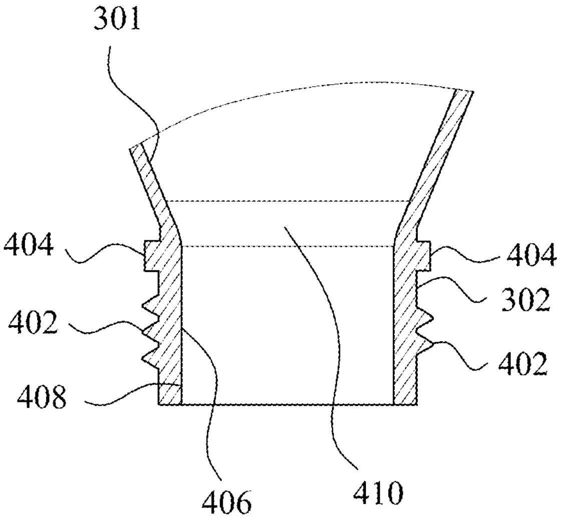
FIG. 5 illustrates an exterior threaded portion of the light bulb shell according to the disclosed embodiments.

Exterior threaded portion 302 is provided on the bottom of light bulb shell 102. Exterior threaded portion 302 is shown in greater detail by FIG. 5. Threads 402 may be a modified pipe thread. A partial thread may be implemented in order to reduce costs. Threads 402 are separated from shaped portion 301 by protrusion 404. Protrusion 404 also helps fit light bulb shell 102 with bulb cap 106.

The interior of exterior threaded portion 302 may be referred to as mating part 406. Mating part 406 includes a tapered draft 408. Tapered draft 408 tapers inward along the length of mating part 406. Tapered draft 408 may tap at an angle between 0.5 to 3°. Thus, the passage 410 of light bulb shell 102 to receive bulb cap 106 may get slightly thinner the further it goes towards shaped portion 301.

Referring back to FIG. 4, DC connector 304 may be shown extending from the bottom surface of bulb cap 106 to resemble a conventional light bulb. This feature is disclosed in greater detail below. The size of light bulb shell 102 is important as well to accommodate the heat generated by light emitting assembly 104. Light bulb shell 102 may be about 20% larger than conventional light bulb shells to provide enough air and volume to accommodate the generated heat. This size may vary depending on the function of light bulb 200 and the amount of heat generated by light emitting assembly 104. This specified size also allows light bulb shell 102 to be made of plastic, which is waterproof.

Figure 6:
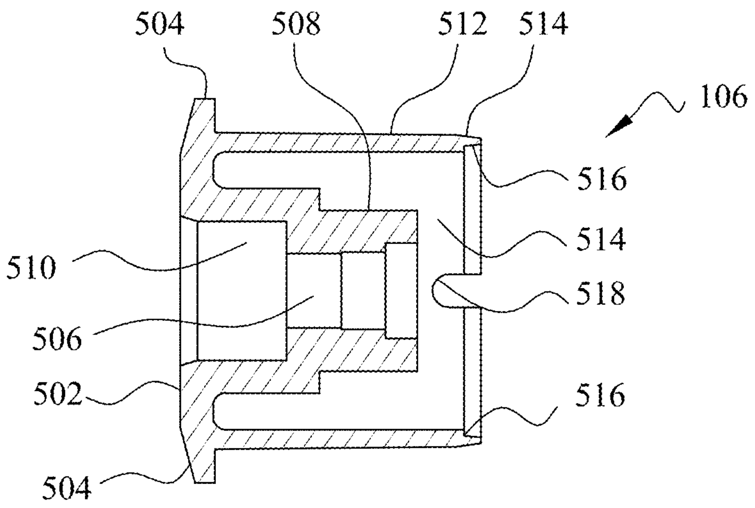
FIG. 6 illustrates a cut-away view of the bulb cap according to the disclosed embodiments.

FIG. 6 depicts a cut-away view of bulb cap 106 according to the disclosed embodiments. As shown above, bulb cap 106 is circular to fit within light bulb shell 102. Bulb cap 106 includes bottom surface 502 that forms the surface that engages socket 108 and is opposite shaped portion 301 of light bulb shell 102. Bottom surface 502 includes angled flange portion 504 that encircles the outer edge of the bottom surface. Angled flange portion 504 may extends outwards from the center of bulb cap 106 and taper upwards from bottom surface 502 at an angle. In some embodiments, this angle may be about 15°.

Bulb cap 106 also includes connector passage 506. Connector passage 506 receives DC connector 304 of light emitting assembly 104. Connector passage 506 may be formed by inner casing 508. Inner casing 508 extends from bottom surface 502 into the interior of bulb cap 106. Inner casing 508 also fits DC connector 304 and may be circular.

Connector passage 506 also includes a receiving area 510 to receive part of female connector 208 and O-ring 202 that engages DC connector 304.

Bulb cap 106 also includes mating part 512 that acts as a side surface. Mating part 512 engages mating part 406 of light bulb shell 102. Mating part 512 also tapers inward at a tapered draft 514. Like tapered draft 408, the surface may taper at an angle of 0.5 to 3° in order to fit within light bulb shell 102. This configuration allows bulb cap 106 to be press fit into light bulb shell 102. Alternatively, these two components may be sonic welded together. The components form a water barrier for the interior of light bulb 200. Light bulb 200 may be waterproof within up to 10 feet of water.

Bulb cap 106 also includes interior space 514. Interior space 514 is a hollow portion that surrounds inner casing 508. Hollow portion 514 allows mating part 512 to press inwards to press fit into light bulb casing 102. It also helps reduce the weight associated with bulb cap 106. At the top of mating part, or side surface, 512 is step 516. Step 516 is configured to receive part of light emitting assembly 104, as disclosed below.

Figure 7A:
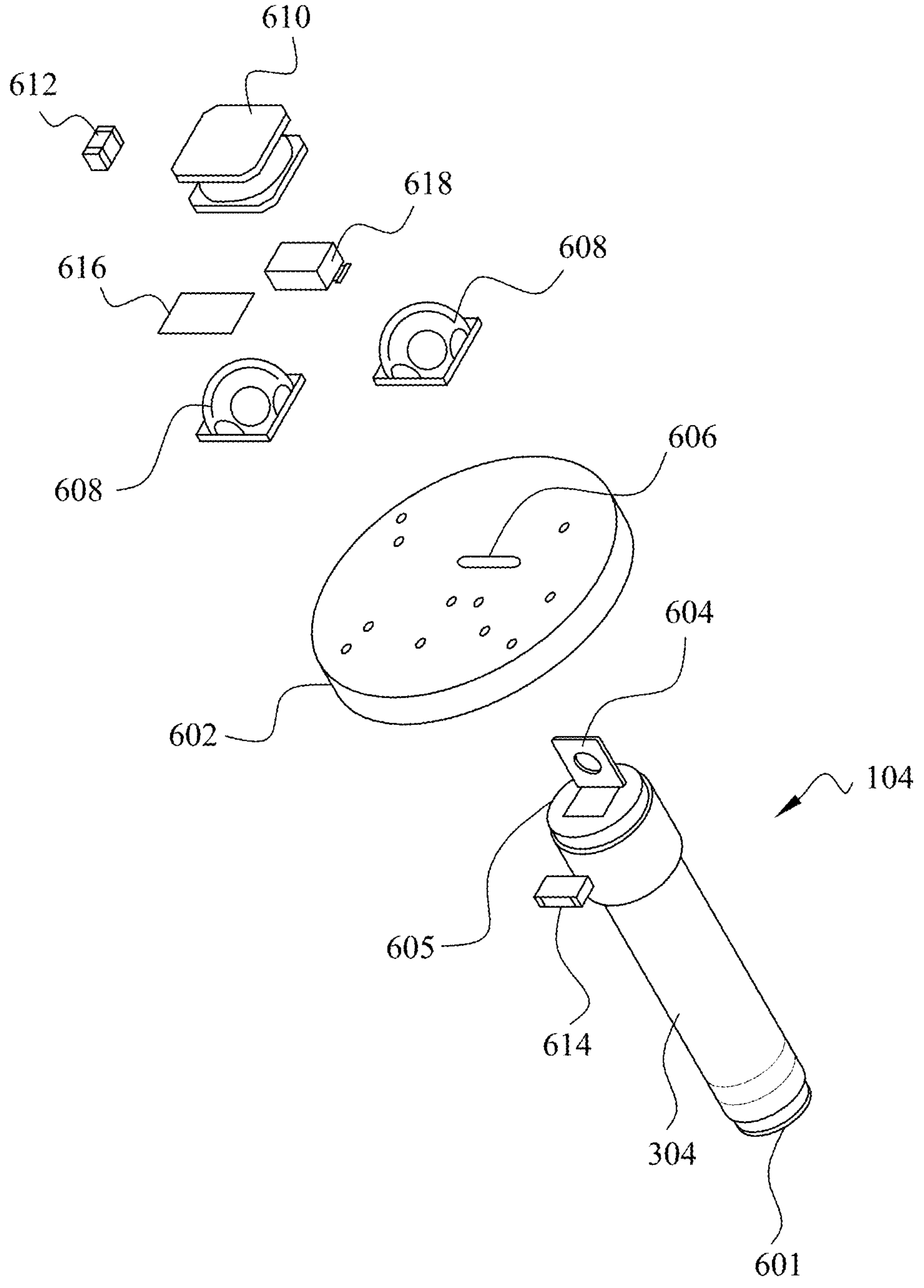
FIG. 7A illustrates an exploded view of the light emitting assembly according to the disclosed embodiments.
Figure 7B:
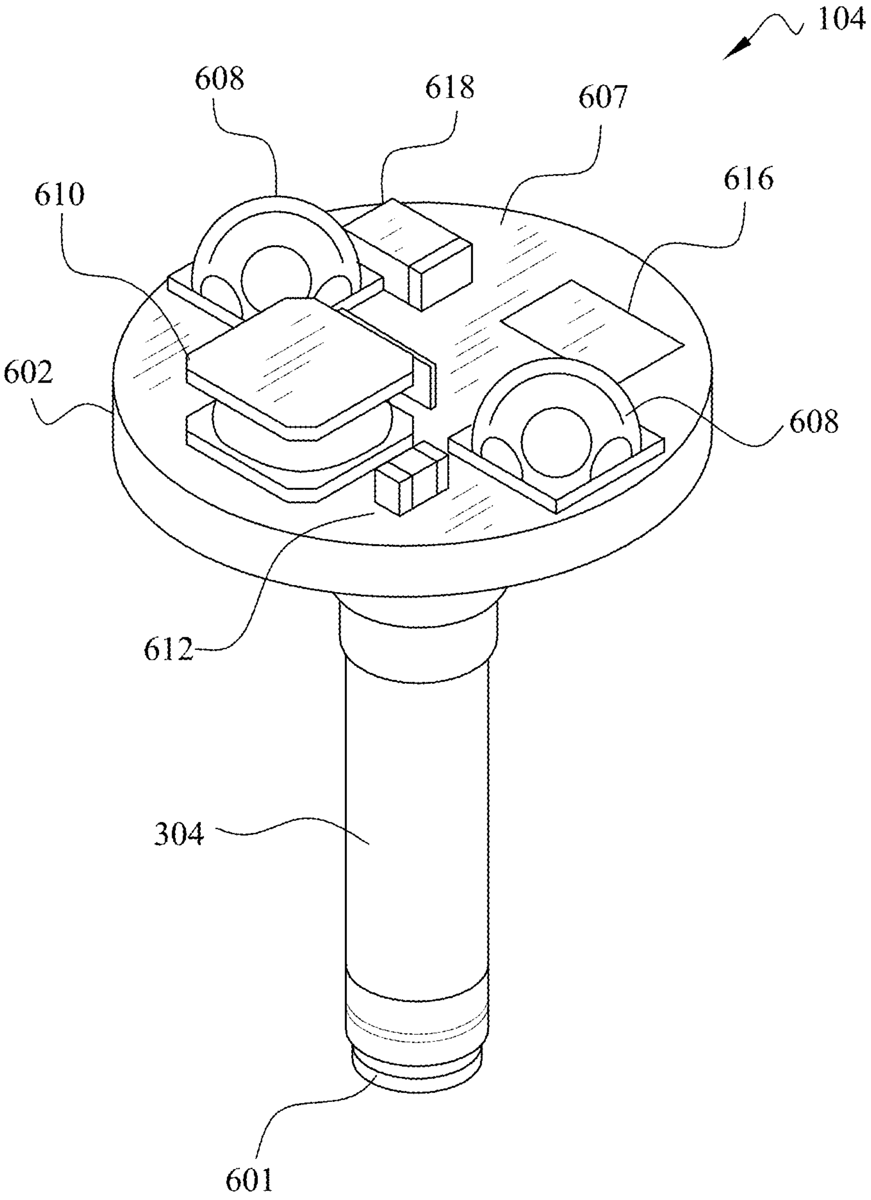
FIG. 7B illustrates a perspective view of the assembled light emitting assembly according to the disclosed embodiments.

FIG. 7A depicts an exploded view of light emitting assembly 104 according to the disclosed embodiments. FIG. 7B depicts a perspective view of an assembled light emitting assembly 104 according to the disclosed embodiments. Light emitting assembly 104 includes printed circuit board 602 and DC connector 304. DC connector 304 may connect with a power source to supply DC power to printed circuit board 602. The two components may be connected by tab 604 that extends from a top end 605 of DC connector 304. Tab 604 is received in slot 606 within printed circuit board 602. Tab 604 may be soldered to printed circuit board 602 using slot 606. Printed circuit board 602 may be circular and have a diameter to fit within the interior of threaded portion 302. Printed circuit board 602 also fits within bulb cap 106.

Various components to provide light and regulate current are placed on printed circuit board 602. These components are placed on a top side 607 of printed circuit board 602 opposite DC connector 304. LED modules, or LEDs, 608 provide light within light bulb 200. LEDs 608 may be high powered LEDs that provide white light. LEDs 608 may operate at 380 lumens. Preferably, light emitting assembly uses a plurality of LEDs 608. For example, two LEDs may be used. LEDs 608 are configured to face upwards, or perpendicular, from printed circuit board 602. Thus, LEDs 608 emit light into light bulb shell 102. This configuration differs from known light bulbs using LEDs that are oriented in a strip within the bulb shell.

LEDs 608 may be extreme high powered LEDs. The disclosed LEDs may have a viewing angle of 135 degrees. They also may have a thermal resistance, junction to solder point, of 1.8° C./W. They also may have a temperature coefficient of voltage of −5.6 mV/° C. They also may have an ESD withstand voltage of 8000 V. They also may have a DC forward current of 1050 mA and a reverse voltage of −5 V. The disclosed LEDs also may have a forward voltage of 11.2-11.9 V at 350 mA, 85° C. The LED junction temperature may be about 150° C.

Light emitting assembly 104 also includes circuit components to provide a switching circuit that regulates current and heat within light bulb 200. This feature allows light bulb 200 and light emitting assembly 104 to operate for extended periods without damaging the components therewithin. The switching, or LC, circuit includes inductor 610 and capacitor 612. The switching circuit also may include resistor 614 to modulate how much current is provided to the circuit. The switching circuit acts as an electrical resonator to store energy oscillating at a switching frequency of the circuit. By using the switching circuit, heat generated by light emitting assembly 104 may be regulated so that it does not interfere with the operations of light bulb 200.

Inductor 610, capacitor 612, and resistor 614 are placed on printed circuit board 602 along with LEDs 608. Light emitting assembly 104 also includes integrated circuit 616 which handle current regulation with logic and diode 618 also to regulate current within the components. Diode 618 may be in series with inductor 610 and capacitor 612. Diode 618 may configure the circuit to flow in one direction, preferably to LEDs 608. Integrated circuit 616 may be a lighting driver and use its logic also to regulate current within light emitting assembly 104. Diode 618 and integrated circuit 616 are placed on printed circuit board 602. Preferably, all these circuit components are positioned in the plane.

In some embodiments, the components of light emitting assembly 104 may have values. For example, resistor 614 may have a resistance of 1.5 ohms. Capacitor 612 may have a capacitance of 4.7 uF and may be a multilayer ceramic capacitor. Inductor 610 may be a fixed inductor having an inductance of 47 uH at 710 mA and a DC resistance of 491 mOhms. Integrated circuit 616 may be a LED light driver operating as buck LED driver for 6-60V and 1 A. DC connector 304 may be a DC power connector having the dimensions of 3.5×1.1 mm and is a power plug spring type with groove. Diode 618 may be a Schottky diode operating at 1 A and 40V.

Figure 8:
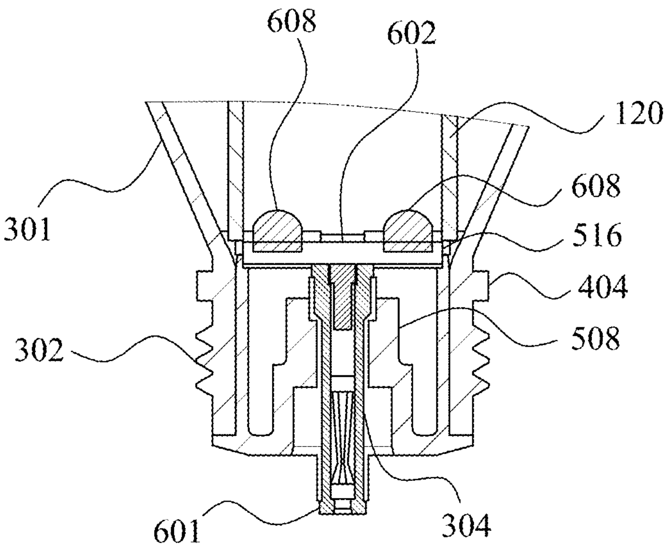
FIG. 8 illustrates a cut-away view of the light bulb showing a fitted light bulb shell, a light emitting assembly, and a bulb cap according to the disclosed embodiments.

DC connector 304 includes tip 601. Tip 601 may be the portion of DC connector 304 that extends out from bottom surface 502 of bulb cap 106. Tip 601 may engage a power source outside light bulb 200 to receive power. DC connector 304 is insert molded or overmolded within bulb cap 106. This feature may be shown in FIG. 8, which depicts a cut-away view of light bulb 200 showing a fitted light bulb shell 102, light emitting assembly 104, and bulb cap 106 according to the disclosed embodiments.

Light emitting assembly 104 is insert molded or interference fitted within connector passage 506 using DC connector 304. This fitted piece may withstand up to 25 pounds of force. Printed circuit board 602 rests or is fitted to engage step 516 of bulb cap 106. As shown, LEDs 608 are oriented to emit light upwards and away from printed circuit board 602.

Figure 9:
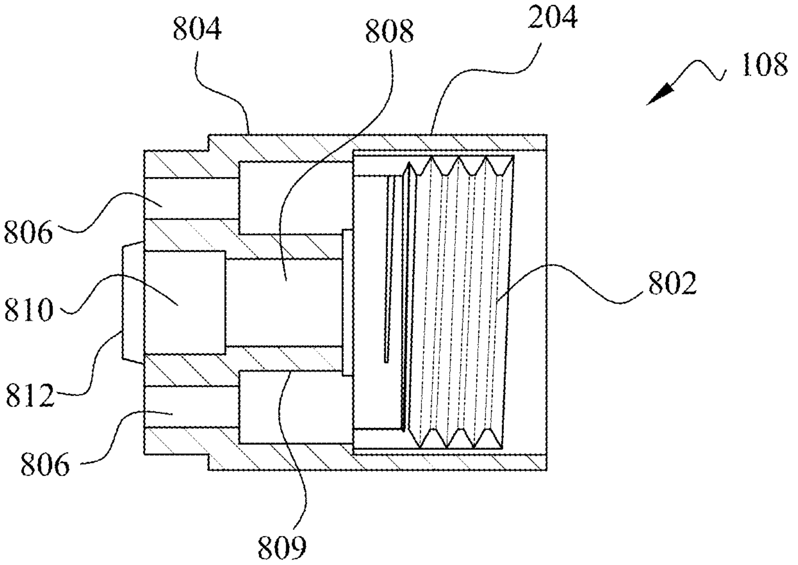
FIG. 9 illustrates a cut-away view of a socket according to the disclosed embodiments.

FIG. 9 depicts a cut-away view of socket 108 and socket housing 204 according to the disclosed embodiments. As disclosed above, socket 108 may receive light bulb 200. In some embodiments, interior threaded portion 802 engages exterior threaded portion 302 of light bulb shell 102 to secure light bulb 200 to socket 108. Other means may be used to anchor light bulb 200 to socket 108, such as an adhesive, press fitting, and the like. Socket housing 204 may enclose interior threaded portion 802 and represent an "upper" portion of socket 108. The interior of socket housing 204 may be hollow to provide a passage to fit the bottom of light bulb 200.

Socket 108 also includes connector portion 804. Connector portion 804 may include casings to enclose passages to fit other components of socket 108. Connector portion 804 may be thinner than socket housing 204. Connector portion 804 includes screw receiving passages 806. There may be two screw receiving passages. These receive screws 206. Connector portion 804 also includes connector passage 808 enclosed by connector casing 809. Connector portion 804 may receive female connector 208 that engages DC connector 304 of light emitting assembly 104. This connection is shown in greater detail below. Connector portion 804 also include extended part 812 that surrounds area 810 below connector passage 808. Extended part 812 by be used to align socket 108 with mount 110.

Figure 10:
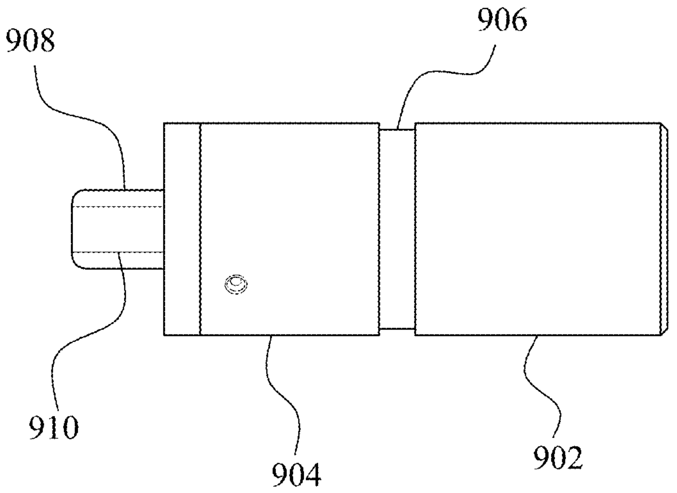
FIG. 10 illustrates a side view of a female connector according to the disclosed embodiments.

FIG. 10 depicts a cut-away view of female connector 208 according to the disclosed embodiments. Female connector 208 is inserted into connector passage 808 and fitted within connector casing 809. It also extends into receiving area 510 of bulb cap 106 to connect to DC connector 304 of light emitting assembly 104. Female connector 208 may be used to convert and mount light bulb assembly 100 onto different sized pipes and fixtures.

Female connector 208 includes upper section 902 and lower section 904. Upper section 902 may be received in receiving area 510. Lower section 904 may remain in socket 108. The sections are separated by depression 906. Depression 906 encircles female connector 208 and is configured to engage O-ring 202. O-ring 202 rests in depression 906 when light bulb assembly 100 is fitted together. Lower section 904 stabilizes female connector 208 within socket 108. Two parts extend from the bottom surface of lower section 904. Positive connector 908 extends from an outer boundary of lower section 904. It may be used to align female connector 208 and hold a connection to the female connector in place. Negative connector 910 may extend from the center of the bottom surface of lower section 904. Thus, connectors 908 and 910 provide the connections to a power source for light bulb assembly 100.

Figure 11:
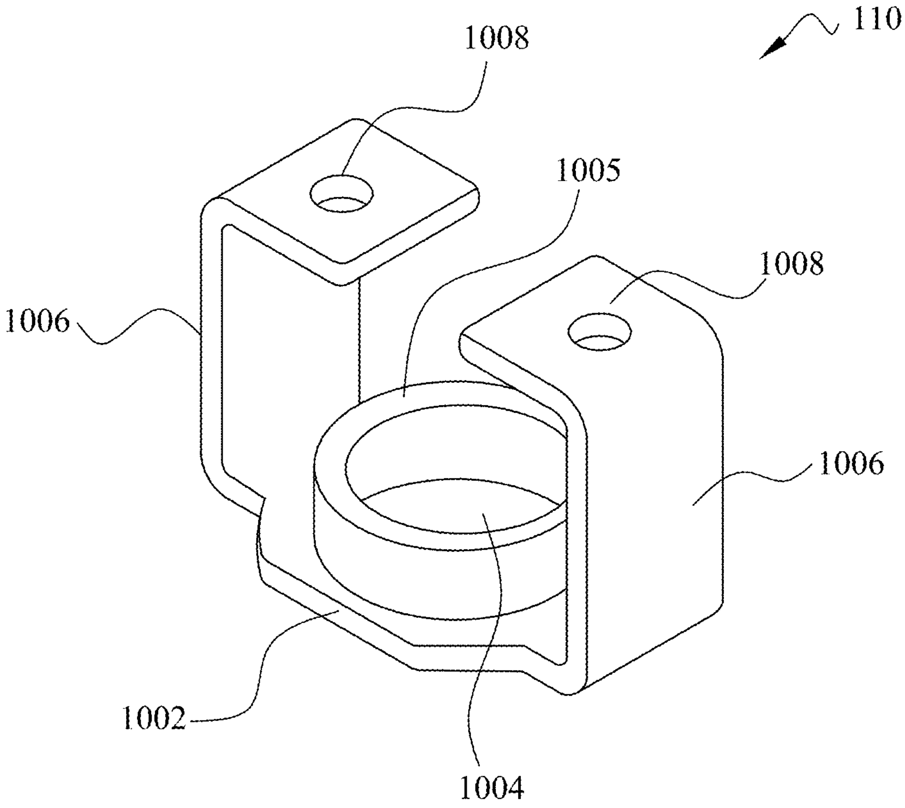
FIG. 11 illustrates a perspective view of a mount according to the disclosed embodiments.

FIG. 11 depicts a perspective view of mount 110 according to the disclosed embodiments. Mount 110 allows waterproof light bulb assembly 100 to be mounted to a number of different fixtures, including those with older pipe fittings. Mount 110, therefore, allows existing fixtures to be retrofitted with a waterproof light bulb, thereby making older light fixtures usable outside or in severe weather.

Mount 110 includes base 1002. Base 1002 includes hole 1004 having a border 1005. Hole 1004 and border 1005 allow mount 110 to be placed a pipe fitting. In some embodiments, hole 1004 is sized to fit a certain type of fitting. Mount 110 also includes arms 1006 that extend outwards from base 1002. Arms 1006 curve inwards as well to align holes 1008 with the bottom of socket 108. Holes 1008 receive screws 206 to secure socket 108 and mount 110 together. Arms 1006 extend from base 1002 so that one may have access to the bottom of socket 108 and to female connector 208.

Figure 12:
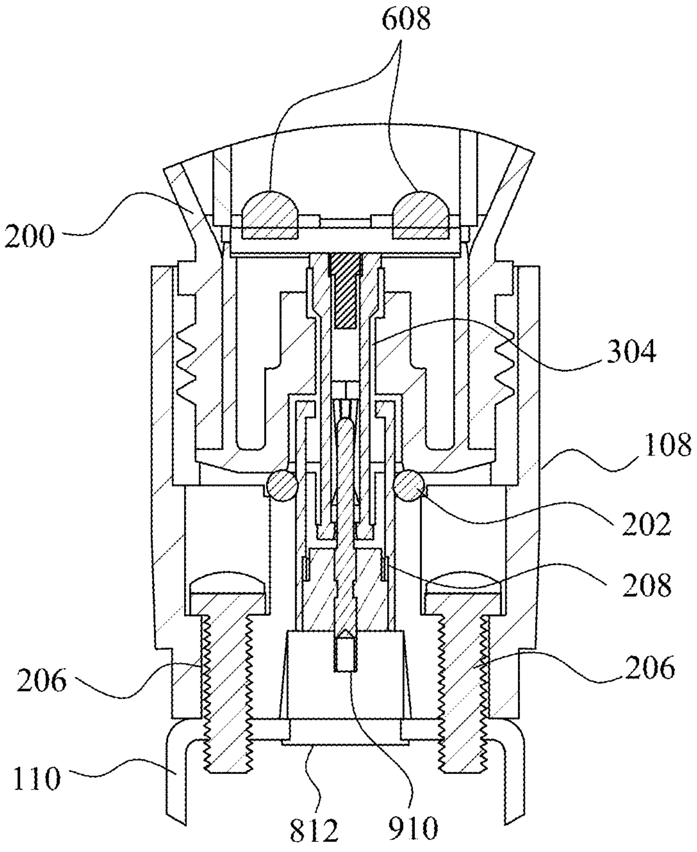
FIG. 12 illustrates a cut-away view of a waterproof light bulb assembly according to the disclosed embodiments

FIG. 12 depicts a cut-away view of an assembled waterproof light bulb assembly 100 according to the disclosed embodiments. FIG. 11 shows the components fitted and secured together to provide a waterproof, sealed fit to protect the components within light bulb 200. As shown, light bulb 200 is secured in socket 108 using threaded portions 302 and 802. DC connector 304 is received within female connector 208 to provide a DC power receptacle for light emitting assembly 104. LEDs 608 are configured to illuminate upwards into light bulb shell 102. Screws 206 secure socket 108 to mount 110 while extended part 812 fits between arms 1008.

It also may be shown that female connector 208 along with O-ring 202 provides a seal between socket 108 and light bulb 200. Positive and negative connectors 908 and 910, respectively, are shown extending outwards to be soldered to wires or connect to a power source for light bulb 200. All components are fitted to provide a waterproof seal that allows the disclosed waterproof light bulb assembly to be used outside and in wet conditions without exposing the circuits to the elements. Further, the light emitting assembly is configured to regulate the amount of heat generated so as to not overheat or damage the components. Once placed in the secure, waterproof fitting, the disclosed assembly does not need to be replaced or fixed for an extended period of time so that the disclosed assembly may be used in remote locations.

It may be appreciated that the disclosed embodiments, including light bulb 102, waterproof light bulb assembly 100, and light emitting assembly 104 are comprised, or mostly comprised, of plastic materials. This feature is in contrast to conventional light bulbs using LEDs that are comprised, at least partially, of metal. These metal component bulbs may dissipate heat but are ill-suited for the disclosed embodiments as they are not able to withstand exposure to outdoors or wet conditions. The metal corrodes and rusts over time so that these conventional light bulbs cannot be used and causes damage to the light fixture. The disclosed embodiments, by regulating the generated heat, is able to use plastic components that can withstand outdoor and wet conditions.

Further, as the light bulb assembly 100 includes a lens assembly 12 that reflects and refracts the light beam emitted from light emitting assembly 104, light bulb shell 102 does not need to made frosted and can be made of clear plastic. An upward-facing light bulb assembly that has an appearance of any traditional candelabra light bulb can thus be provided in accordance with the disclosed embodiments. The light bulb assembly of the disclosed embodiments can be used indoors and outdoors with a wet location environment.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A waterproof light bulb, comprising:

a clear plastic bulb shell having a threaded portion corresponding to a first mating part;

a bulb cap to fit into the first mating part of the clear plastic bulb shell and having a passage centered therewithin;

a light emitting assembly having a direct current (DC) connector to fit through the passage within the bulb cap, wherein the light emitting assembly includes a printed circuit board connected to the DC connector, and a plurality of LEDs (light emitted diodes) configured on the printed circuit board to face upwards from the printed circuit board; and a lens assembly located on a top of the light emitting assembly, including:

a lens having a cut-edged top surface, and a peak centered with respect to the cut-edged top surface and positioned to point towards the light emitting assembly; and a hollow cylinder supporting the lens, wherein the lens is inserted on a top of the hollow cylinder, and a height of the hollow cylinder is determined based on a focal distance between the lens and the light emitting assembly, the lens is configured to reflect and refract a light emitted from the light emitting assembly.

2. The waterproof light bulb of claim 1, wherein the light emitting assembly further includes a switching (LC) circuit configured on the printed circuit board configured to regulate an amount of heat generated by the light emitting assembly.

3. The waterproof light bulb of claim 1, wherein the light emitting assembly is seated on the bulb cap, and a part of the hollow cylinder of the lens assembly is inserted into the bulb cap to cover the light emitting assembly.

4. The waterproof light bulb of claim 1, wherein the lens is in a shape of an upside-down pyramid.

5. The waterproof of light bulb of claim 1, wherein a lower part of the hollow cylinder is narrower than a rest of the hollow cylinder and a diameter of the lower part is smaller than that of the rest of the hollow cylinder, wherein the lower part of the hollow cylinder is configured to be inserted into the bulb cap.

6. The waterproof light bulb of claim 1, wherein a size of the plastic bulb shell corresponds to an amount of heat generated by the light emitting assembly.

7. The waterproof light bulb of claim 1, wherein the bulb cap includes a second mating part to fit into the first mating part of the plastic bulb shell, and wherein the second mating part includes a tapered portion extending into the plastic bulb shell.

8. The waterproof light bulb of claim 1, wherein the DC connector includes a cylindrical portion and an extension portion that extends beyond a bottom surface of the bulb cap.

9. The waterproof light bulb of claim 2, wherein the light emitting assembly includes a diode to regulate current within the switching circuit.

10. The waterproof light bulb of claim 1, wherein the light emitting assembly includes an integrated circuit to regulate current within the light emitting assembly.

11. A waterproof light bulb assembly, comprising:

- a clear plastic bulb shell having a threaded portion corresponding to a first mating part;
- a bulb cap to fit into the first mating part of the clear plastic bulb shell and having a passage centered therewithin;
- a light emitting assembly having a direct current (DC) connector to fit through the passage within the bulb cap, wherein the light emitting assembly includes:
  - a printed circuit board to fit into a step of the bulb cap and connected to the DC connector,
  - a plurality of light emitting diodes (LEDs) configured on the printed circuit board to face upwards from the printed circuit board, and
  - a switching (LC) circuit configured on the printed circuit board configured to regulate an amount of heat generated by the light emitting assembly;
- a lens assembly located on a top of the light emitting assembly, the lens assembly including:
  - a lens having a cut-edged top surface and a peak centered with respect to the cut-edged top surface and positioned to point towards the light emitting assembly; and
  - a hollow cylinder supporting the lens, wherein the lens is inserted on a top of the hollow cylinder, and a height of the hollow cylinder is determined based on a focal distance between the lens and the light emitting assembly, the lens is configured to reflect and refract a light emitted from the light emitting assembly; and
- a socket having an interior threaded portion to receive the threaded portion of the plastic bulb shell, the socket including
  - a female connector to receive the DC connector, and
  - an O-ring positioned in the female connector to engage the DC connector.

12. The waterproof light bulb of claim 11, wherein the light emitting assembly is seated on the bulb cap, and a part of the hollow cylinder of the lens assembly is inserted into the bulb cap to cover the light emitting assembly.

13. The waterproof light bulb of claim 11, wherein a lower part of the hollow cylinder is narrower than a rest of the hollow cylinder and a diameter of the lower part is smaller than that of the rest of the hollow cylinder, wherein the lower part of the hollow cylinder is configured to be inserted into the bulb cap.

14. The waterproof light bulb assembly of claim 11, further comprising a mount connected to a bottom portion of the socket.

15. The waterproof light bulb assembly of claim 11, wherein the lens is in a shape of an upside-down pyramid.

16. A light emitting diode (LED) lighting device, comprising:

- an assembly of a light emitting module and a lens module; and
- a direct current (DC) connector, connected with the light emitting module and extended therefrom for connecting to a power source,
- wherein the light emitting module connected to the DC connector includes
  - a printed circuit board connected to the DC connector,
  - a plurality of LEDs configured on the printed circuit board to face upwards from the printed circuit board, and
  - a switching (LC) circuit configured on the printed circuit board configured to regulate an amount of heat generated by the light emitting module, and
- wherein the lens module is located on a top of the light emitting module and is configured to cover the light emitting module, the lens module includes
  - a lens in a shape having a cut-edged top surface and a peak centered with respect to the cut-edged top surface and positioned to point towards the light emitting module; and
  - a hollow cylinder supporting the lens, wherein the lens is inserted on a top of the hollow cylinder, and a height of the hollow cylinder is determined based on a focal distance between the lens and the light emitting module,
- wherein the lens is configured to reflect and refract a light emitted from the light emitting module.

17. The LED lighting device of claim 16, further comprising a clear plastic light bulb shell for enclosing the assembly of the light emitting module and the lens module, wherein the clear plastic bulb shell has a threaded portion that corresponds to a first mating part.

18. The LED lighting device of claim 17, further comprising a bulb cap to fit into the first mating part of the clear plastic bulb shell and having a passage centered therewithin, wherein the light emitting module fits through the passage within the bulb cap.

19. The LED lighting device of claim 18, further comprising a socket having an interior threaded portion to receive the threaded portion of the plastic bulb shell, the socket including

- a female connector to receive the DC connector, and
- an O-ring positioned in the female connector to engage the DC connector.

* * * * *